United States Patent

[11] 3,588,756

[72] Inventor Byron D. Roylance
San Diego, Calif.
[21] Appl. No. 540,416
[22] Filed Apr. 5, 1966
[45] Patented June 28, 1971
[73] Assignee The United States of America as represented by the Secretary of the Navy

[54] CRYSTAL FILTER CIRCUIT
9 Claims, 7 Drawing Figs.

[52] U.S. Cl. .......... 333/72, 333/70A, 333/76
[51] Int. Cl. .......... H03h 9/00
[50] Field of Search .......... 333/72; 331/76, 161; 328/27, 167; 307/268, 267, 268; 334/15; 329/117

[56] References Cited

UNITED STATES PATENTS

| | | | |
|---|---|---|---|
| 3,079,571 | 2/1963 | Elliott et al. | 333/76 |
| 3,290,624 | 12/1966 | Hines | 333/31 |
| 3,054,969 | 9/1962 | Harrison | 331/76 |
| 3,074,021 | 1/1963 | Rullman | 329/117 |
| 3,315,036 | 4/1967 | Gaunt | 179/15 |
| 2,546,994 | 4/1951 | Fromageot | 179/15 |
| 3,056,890 | 10/1962 | Stoops et al. | 307/268 |
| 2,575,363 | 10/1951 | Simons | 333/72 |
| 3,100,820 | 8/1963 | Svala et al. | 179/15 |
| 2,936,337 | 5/1960 | Lewis | 179/15 |
| 2,870,259 | 1/1959 | Norris | 333/12 |

*Primary Examiner*—Herman Karl Saalbach
*Assistant Examiner*—C. Baraff
*Attorneys*—R. S. Sciascia, G. J. Rubens and John W. McLaren

CLAIM: 1. A circuit for rapidly dissipating residual electrical energy stored by a piezoelectric crystal filter due to pulsed signals impressed thereon comprising:

an inductive reactance having a value substantially equal to the capacitive reactance of the electrostatic capacitance of the crystal in the filter at the crystal resonant frequency;

switch means disposed for effecting conduction through said inductive reactance in circuit with crystal filter; and control means for synchronously operating said switch means to effect said conduction between pulses of said signals impressed upon said crystal filter.

Patented June 28, 1971 3,588,756

INVENTOR
BYRON D. ROYLANCE
BY [signature]
[signature]
ATTORNEYS

CRYSTAL FILTER CIRCUIT

This invention relates to a method and means for significantly improving the performance of piezoelectric crystal filters of the type used in pulsed communications systems.

Though piezoelectric crystal filters have many desirable characteristics when operated in pulsed communications systems, they also have the relatively undesirable characteristic of residually storing an amount of electrical energy after a pulse of electrical energy is applied to the crystal and its associated equipment. Upon cessation of a pulse signal, the residual electrical energy gradually decays or dissipates to a negligible value in a period of time that is related to filter bandwidth and phase response.

The difference in the decay time between that required for an ideal filter and that required for a variety of practical filter designs can differ widely. In many applications it is desirable to reduce the decay time required to dissipate the residually stored electrical energy from the crystal so as to realize a minimum of lost time during which a pulse signal cannot be applied to the crystal. Thus, the characteristic of piezoelectric crystal filters in storing an amount of residual energy precludes their use in certain communications systems which employ relatively high repetition rates. For example, if it is assumed that approximately 1 millisecond is required to remove and dissipate undesired residual electrical energy stored in a crystal, the period required for such dissipation cannot contribute to the detection of intelligence of the input signal; and accordingly, it is apparent that the crystal filter thus limits the amount of intelligence that can be detected in a given period of time. If it is further assumed that a pulse repetition rate of 500 cycles is used, 2 milliseconds would be available for each bit of information. If 1 millisecond is required to dissipate the energy stored in the filter between information bits, then only 1 millisecond or somewhat less is available for the buildup of energy in the filter during which the detection of intelligence can occur.

A number of ways have been suggested in the prior art to remove and dissipate the stored residual energy from a crystal filter in a time period which is less than that required for the filter itself to naturally dissipate such energy. For instance, one such scheme in the prior art employs the use of a negative feedback path which is switched into the circuit at the termination of an information bit. Quenching is initiated at the termination of the input pulse and the input signal during the quench period is insignificant with respect to the negative feedback signal and consequently the input signal is not switched out during this period. In this manner the stored residual electrical energy in the crystal is dissipated, removed or "dumped" as it is sometimes described.

The negative feedback quenching system of the prior art alluded to above requires an amplifier or other means which is capable of producing a 180° phase shift in order to produce the quench effect upon the input signal and the residual electrical energy stored therein. It will be apparent to those skilled in the art that such amplifiers requiring a precise 180° phase shift are subject to instability and drift with respect to phase shift which can reduce their effectiveness of operation. Additionally, such amplifiers and associated feedback loops represent a significant addition to the filter circuitry complexity which it is desirable to avoid if at all possible.

Accordingly, it is a prime object of the present invention to provide a method and means for rapidly dissipating residual electrical energy stored by piezoelectric crystal filters due to periodic signals impressed upon the filter.

An equally important object of the present invention is to provide such a method and means for rapidly dissipating residual electrical energy from a crystal filter which is simple in structure and highly effective in performance.

Another object of the present invention is to provide an improved crystal filter wherein the cyclically useable time of such filter is significantly enhanced by reason of rapid and effective dissipation of electrical energy residually stored in the filter.

Yet another object of the present invention is to affect such improved performance and increased cyclic period of useability of a crystal filter without materially adversely effecting its desireable operative characteristics.

In its preferred and fundamental form the present invention comprises an inductive reactance having a value substantially equal to the electrostatic capacitive reactance of the filter at the crystal resonant frequency. Such capacitive reactance it should be noted is the total electrostatic capacitive reactance of the crystals and the associated crystal holders of the filter; in certain cases, as will be explained more fully hereinafter, associated filter circuitry may reflect an impedance across the crystals which will have an effect on such total electrostatic capacitive reactances. Appropriate switch means are disposed for effecting conduction through the inductive reactance in circuit with the crystal filter so that the combined electrostatic capacitive reactance of the crystal filter and the inductive reactance combines to appear as a resistive impedance resulting in a very rapid dissipation of the residual electrical energy characteristically stored by piezoelectric crystals. Further control means are provided for operating the switch means to cause such conduction to take place during the absence of periodic signals such as pulse signals, for instance, impressed upon the crystal filter. Thus, the concept of the present invention provides that residually stored electrical energy is quickly, rapidly and effectively dissipated, improving the cyclic period of time during which a crystal filter is useable to receive intelligence signals, which are frequently in the form of pulse signals. During the reception of such intelligence signals, the means employed in accordance with the concept of the present invention. is effectively inoperative so that the crystal filter's response characteristics are unimpaired.

These and other features, advantages and objects of the present invention will appear more fully from the description of several embodiments of the present invention taken together with the illustrative drawings and its scope will be pointed out more particularly in the appended claims.

Figure 6:
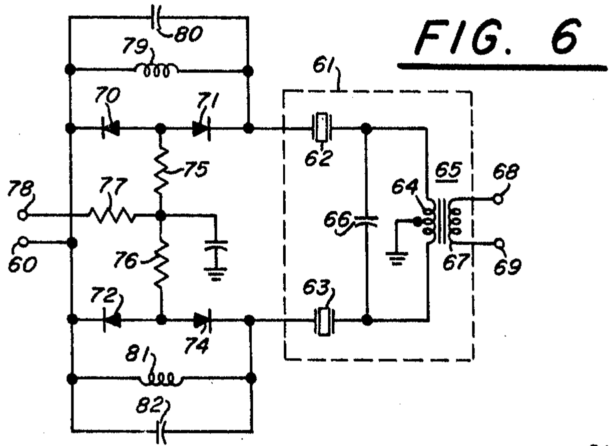
Figure 7:
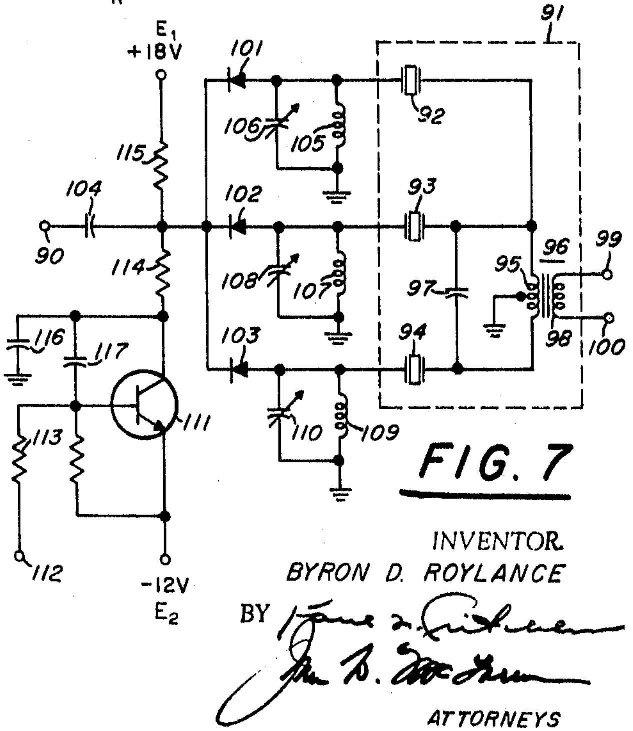

FIG. 6 is a schematic wiring diagram of another embodiment of the present invention employing gated diodes to effect rapid dissipation of the residually stored electrical energy from a crystal filter circuit; and FIG. 7 is a schematic wiring diagram showing a variant of the concept of the present invention employing diodes which are gated under the control of a transistor circuit to rapidly dissipate the residually stored electrical energy from a crystal filter circuit.

Crystal filters may consist of any number of crystals, frequently of the piezoelectric type arranged in various circuit configurations. The concept of the present invention is preferably applied to each crystal in the filter and therefore is not dependent upon or limited by the actual filter design in a given filter embodiment. For instance, where several crystals are connected in parallel, a single inductive reactance may or may not be employed for each individual crystal as is desirable. The decay time of a complete crystal filter is dependent upon the overall crystal filter characteristic. The decay time of the crystal filter using the concept and teaching of the present invention is dependent upon the characteristics of the individual crystal parameters as modified by the employment of the concept and teaching of the present invention.

Figure 1:
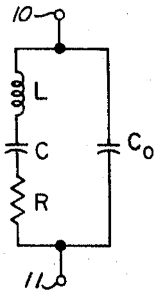
FIG. 1 is a schematic diagram illustrating the characteristics of a crystal by means of an equivalent electrical circuit.
Figure 2:
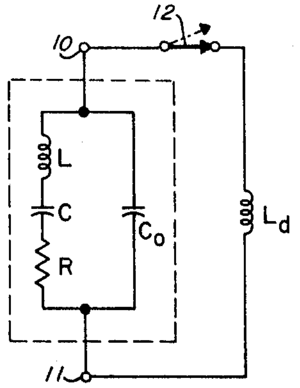
FIG. 2 is a diagram illustrating how the most fundamental form of the present invention may be adapted to the equivalent electrical circuit of a crystal as shown in FIG. 1 to rapidly dissipate residually stored electrical energy from such a crystal.

A crystal in itself has electrical characteristics and qualities which may be illustrated by means of an equivalent electrical circuit as shown in FIG. 1. In FIG. 1 the points 10 and 11 represent the crystal terminals while the capacitance $C_o$ represents the total electrostatic capacitance of the crystal itself and its holder. C is representative of the equivalent motional arm capacitance, and L is representative of the equivalent motional arm inductance, while R is representative of the equivalent motional arm resistance. The Q of the crystal is equivalent to the inductive reactance divided by the resistance, i.e. $Q=X_L/R$; the bandwidth of the crystal equals the frequency divided by Q, i.e. bandwidth $=f/Q$. The period of time which is required to dissipate stored residual energy in a crystal may be designated as its decay time and such decay time is proportional to Q. Therefore, if, as illustrated in FIG. 2, an inductance $L_d$ with a Q of $Q_d$ is shunted across the crystal at the terminals 10 and 11, and the electrical values are such that the inductive reactance $X_{Ld}$ equals the capacitive reactance $X_{co}$ of $C_o$ at or near the crystal resonant frequency, the capacitive reactance of $C_o$ will be effectively canceled and the crystal will look into an apparent parallel resistance or $R_p$ by reason of the parallel resonance effected between the inductive reactance $X_{Ld}$ and the capacitive reactance $X_{co}$. The resultant effect of such parallel resonance arrangement is carried out by means of an appropriate switch connection 12 as illustrated schematically in FIG. 3 wherein the parallel resistance $R_p$ is substituted for the substantially equal reactances of the parallel connected reactances $X_{Ld}$ and $X_{co}$. When the inductive reactance $X_{Ld}$ is removed from conductive connection with the crystal filter, (as shown by the dash line position of the switch 12) the crystal is ready to receive intelligence signals without the interference of an undesirable amount of residually stored electrical energy and the crystal retains its normal and usual response characteristics relative to the remainder of the filter circuitry with which it is associated.

Figure 3:
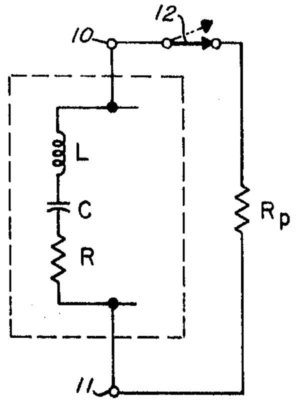
FIG. 3 is an illustration of the equivalent result of the application of the concept of the present invention to rapidly dissipate residually stored electrical energy from a crystal filter as represented by an equivalent electrical circuit.

It should be noted that the Q′ of FIG. 3 may be expressed as $$Q'=\frac{X_L}{R+R_p}$$

and thus the Q′ can easily be made much less than the Q of FIG. 1. As the decay time is proportional to Q, the decay time of FIG. 3 can be made much less than that of FIG. 1, moreover; as the crystal is part of a filter the associated circuitry will reflect an impedance across the crystal which will modify the above explanation and considerations to the extent that $X_{co}$ will consist of the crystal $X_{co}$ and circuitry reactances as well.

The application of the concept and the teaching of the present invention is to operate the crystal filter in its normal manner by leaving the switch of FIGS. 2 and 3 open when pulsed intelligence signals are applied. After intelligence signals have been impressed upon the filter, the residually stored electrical energy is dissipated or "dumped" by closing the switch 12.

It is important to note that the inductive reactance provided by the coil $L_d$ need not be applied directly across the crystal in parallel arrangement but may be arranged to be conductively connected in series with the crystal. In the latter mentioned case, $L_d$ will be of such inductive reactance that its reflected reactance across the crystal will still be the same as that discussed for the condition where the inductive reactance of the coil is applied in parallel connection across the crystal. Additionally, it will be appreciated by those skilled in the art that the switch means referred to in the schematic equivalent electrical circuit illustrations of FIGS. 2 and 3 can readily be devised of any of a number of types as desired by employing diodes, transistors, vacuum tubes, silicon controlled rectifiers or reed relays, to name several examples.

Figure 4:
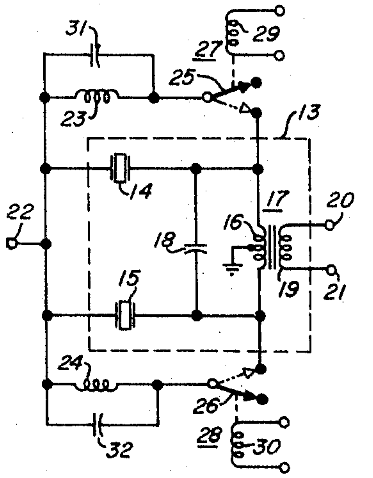
FIG. 4 is a schematic diagram of an embodiment of the present invention applied to a crystal filter system by employing a relay actuated switch means.

FIG. 4 illustrates a practical embodiment of the concept and teaching of the present invention which includes a piezoelectric crystal filter as indicated generally by the combination of elements enclosed within 13. The filter 13 comprises two parallel connected piezoelectric crystals 14 and 15 disposed in circuit with the center-tapped primary coil 16 of a transformer 17 and a capacitor 18. The secondary or output winding 19 of the transformer 17 is connected to output winding 19 of the transformer 17 is connected to output terminals 20 and 21 where the output of the filter is developed.

An input terminal 22 is connected and arranged to accept a typical input signal in the form of pulsed electrical energy. Inductive reactances in the form of coils 23 and 24 are arranged to be conductively connectable in parallel across the piezoelectric crystals 14 and 15, respectively. Such connection is completed through the movable contacts 25 and 26 of two reed relays 27 and 28 arranged to be operatively actuated by appropriate coil means 29 and 30, respectively. Capacitors 31 and 32 are connected in parallel with the inductive reactances in the form of coils 23 and 24, respectively, as illustrative of an expedient which may be employed in conjunction with coils to produce the required inductive reactances in cases where physically realizeable inductances of the proper values are not readily designable for use in a particular filter. Capacitors 31 and 32 may be variable for convenience of adjustment if desired.

In operation of the circuit shown in FIG. 4, when the reed contacts 25 and 26 are in the position shown by the solid lines, the filter will receive a pulsed signal and operate in its normal manner. However when the reed contacts 25 and 26 are actuated to their alternate position, as indicated by the dash line arrows of FIG. 4, the inductive reactances represented by the tank circuits comprising coil 23 and capacitor 31, and that comprising coil 24 and capacitor 32, are connected in parallel relationship with respect to the respective piezoelectric crystals 14 and 15. Accordingly, the net inductive reactance represented by the previously mentioned tank circuits is shunted across the crystals and such inductive reactance together with the total electrostatic capacitance of each respective crystal and its holder presents an equivalent resistive value to the crystal, discharging its residually stored electrical energy rapidly and effectively. Accordingly, the crystal filter is in condition to quickly accept additional pulsed intelligence information and operate properly without the undesirable interference effects of such residually stored electrical energy. The reed relays 27 and 28 are adapted to be operated in synchronism with the pulsed input signals so that the inductive reactances as represented by the tank circuits, and more particularly the coils 23 and 24, are only connected into conductive circuit with the filter when no input pulse signal is being received into the circuit.

In the particular embodiment of FIG. 4 a capacitance is arranged in parallel arrangement with each of the inductive coils 23 and 24. These capacitances, 31 and 32, are chosen so that the resultant parallel tank circuits have a resonant frequency above the crystal frequency. The tank circuits therefore appear as an inductor at the frequency at which the crystal filter operates.

Figure 5:
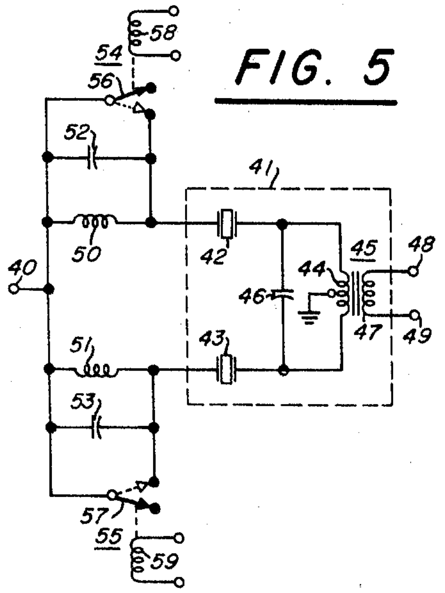
FIG. 5 is a schematic diagram of another embodiment of the present invention employing a variant arrangement of a relay operated switch means in accordance with the concept of the present invention.

The circuit of FIG. 5 is a variant embodiment of the present invention wherein the inductive reactance employed to rapidly dissipate the residually stored electrical energy from the piezoelectric crystal filter is arranged and connected in series relationship to the piezoelectric crystals rather than being disposed to be connectable in parallel arrangement as was the case with the embodiment illustrated schematically by FIG. 4.

An input terminal 40 is adapted to receive an input signal in the form of pulsed electrical energy. A filter indicated by the dash line configuration shown at 41 includes two piezoelectric crystals 42 and 43 together with the center-tapped, primary coil 44 of a transformer 45. A capacitor 46 is connected in parallel with the primary winding 44 of the transformer 45 so as to form a tank circuit. A secondary coil 47 completes the filter arrangement 41 and has two terminals 48 and 49 across which the output of the filter appears. Accordingly, it will be appreciated that the filter portion 41 of the circuitry schematically illustrated in FIG. 5 is substantially identical in arrangement and disposition to the filter portion 13 of the circuit schematically illustrated in FIG. 4.

However, the inductive reactances in the form of coils 50 and 51 are connected in series circuit relationship with respect to the piezoelectric crystals 42 and 43, respectively, as contrasted to the disposition of the comparable inductive reactances of the schematic diagram of FIG. 4 wherein the coils 23 and 24 are arranged and disposed to be connectable in parallel relationship with respect to the piezoelectric crystals 14 and 15, respectively.

Capacitors 52 and 53 are connected in parallel relationship with respect to the coils 50 and 51, respectively, in much the same manner and for the same reasons as previously elucidated in connection with the explanation of the circuits schematically illustrated in FIG. 4, and may be variable if desired. By contrast, however, the reed relays 54 and 55 of the circuit of FIG. 5 are disposed and connected so that the movable contacts 56 and 57 are arranged to complete a conductive path in parallel with the respective associated capacitors and inductors.

The reed contact 56 is arranged to complete a conductive path in parallel with the capacitor 52 and the coil 50, while the reed contact 57 is arranged to complete a conductive path in parallel with the capacitor 53 and the coil 51. The reed relay coil 58 actuates the movable contact 56 of the reed relay 54 so that the conductive path in parallel with the associated inductive reactance in the form of the coil 50 and the capacitor 52 may be completed to effectively short circuit the inductive reactance 50. Similarly, the actuating coil 59 of the reed relay 55 is operative to connect or disconnect the relay contact 57 so as to complete the parallel conductive path as desired around the inductive reactance in the form of the coil 51 and the capacitor 53 to effectively short circuit the net amount of inductive reactance represented by that combination.

Accordingly, when the reed relays 54 and 55 are operative to maintain the reed contacts 56 and 57 in the position indicated by the dashed arrows, the crystal filer 41 operates in its normal fashion since the combinations of the coil 50 and the capacitor 52, and the coil 51 and the capacitor 53, respectively, have little or no effect upon the operation of the crystal filter 41 as they are effectively bypassed. However, after an input signal of pulsed electrical energy has been received the reed relays 54 and 55 operate to open the respective conductive paths in parallel with the two inductive reactances 50 and 51 so that the crystals 42 and 43 look into inductive reactances. The residually stored energy retained by the crystals 42 and 43 after having been pulsed by an electrical signal is therefore rapidly dissipated by reason of the total c8pacitance of each crystal and its holder combining with its respective associated inductive reactance to produce the equivalent effect of a purely resistive connected element.

It will be readily appreciated by those skilled in the art that the circuit arrangement schematically illustrated in FIG. 5 is similar in many respects to that illustrated in FIG. 4 with the primary difference being that the arrangement of the embodiment of FIG. 4 is adapted to place the inductive reactance into parallel connection with its associated piezoelectric crystal while the embodiment illustrated in FIG. 5 is arranged, adapted and disposed to place the inductive reactance in series connection with its associated piezoelectric crystal. In either case the inductive reactance combines with the inherent capacitance of the piezoelectric crystal and its holder to rapidly and quickly dissipate residually stored energy from the crystal and thereby enhance and increase its usefulness for the reception of additional pulsed intelligence signals.

The circuit of FIG. 6 illustrates yet another embodiment of the concept and teaching of the present invention wherein diodes are employed to control the effective conductive condition of inductive reactance relative to the respective piezoelectric crystals of the filter, the diodes being controlled by a gating signal in synchronism with the pulsed signal input to the filter. An input terminal 60 is arranged to receive a pulsed signal input in a manner similar to the previously described embodiments of FIGS. 4 and 5. The input is connected and arranged to be impressed upon a crystal filter indicated within the confines of the dash line enclosure 61. The filter comprises two piezoelectric crystals 62 and 63 together with the primary coil 64 of a transformer 65. A capacitor 66 is connected in parallel with the center-tapped, primary coil 64 so as to form a parallel tank circuit therewith. The filter is completed by a secondary winding 67 which produces its output across two terminals 68 and 69.

Two diodes 70 and 71 are arranged in back-to-back series connection between the crystal 62 and the input signal impressed upon the input terminal 60. Similarly, two series-connected, back-to-back diodes 72 and 74 are arranged in series connection between the piezoelectric crystal 63 and the input terminal 60 where the pulsed input signal appears. A resistor 75 is connected between the diodes 70 and 71 while a similar resistor 76 is connected between diodes 72 and 74. Both the resistors 75 and 76 are commonly connected to a resistor 77 across which a gating signal may be developed by reason of being impressed upon the input terminal 78 of the gating control circuit.

A net inductive reactance in form of the coil 79 and the capacitor 80 is connected in parallel with the back-to-back diode arrangement 70 and 71 previously described. Similarly, a net inductive reactance in form of the coil 81 and the capacitor 82 is connected in parallel relation with respect to the back-to-back diodes 72 and 74. Capacitors 80 and 82 may be variable, if desired for convenience of adjustment.

In operation, a gating signal of positive potential with respect to ground will cause each pair of diodes 70 and 71, 72 and 74 to conduct through a return path including the source of input signal; this, in turn, creates an effective radio frequency, short circuit across the respectively parallel connected coils 79 and 81. When the gate signal is negative with respect to ground, the diodes are rendered nonconductive and therefore represent an effective open circuit with respect to the crystal filter 61 and more particularly relative to the residually stored energy retained in the crystals 62 and 63 after the pulsed intelligence signal has been impressed across the filter. As a result, the crystals 62 and 63 look into net inductive reactances which together with the total capacitive reactance of the respective crystals and their holders produce equivalent total resistive elements. This effect rapidly and efficiently dissipates the residually stored electrical energy from the respective crystals.

The signal impressed upon the gating input terminal 78 to control the respective paired diodes 70 and 71, and 72 and 74 is arranged to be synchronous with the pulsed input signal appearing at the input terminals 60. The crystal filter 61 therefore operates in substantially normal fashion when the pulsed input signal is received and the inductive reactances are conductively connected to dissipate the residually stored electrical energy from the crystals during the period between pulsed input signals.

The schematic diagram of FIG. 7 illustrates another variant arrangement of circuitry embodying the concept of the teaching of the present invention and employing a transistor control circuit. The embodiment of FIG. 7 includes an input terminal 90 where the pulsed signal intelligence is impressed upon the filter. the crystal filter is indicated within the confines of the dash line 91 and comprises three parallel-connected, piezoelectric crystals 92, 93 and 94. Connected in parallel between piezoelectric crystals 93 and 94 is the primary coil 95 of an output transformer 96 and a capacitor 97. The capacitor 97, together with the center-tapped, primary coil 95 of the output transformer 96, forms a tank circuit with respect to the piezoelectric crystals 93 and 94. The crystal filter is completed by the secondary coil 98 of the transformer 96 which has output terminals 99 and 100 across which the output of the filter appears.

The piezoelectric crystal 92 is connected to the diode 101; the piezoelectric crystal 93 is connected to a diode 102, and the piezoelectric crystal 94 is connected to a diode 103. The diodes 101, 102 and 103 are, in turn, commonly connected to receive the input pulsed signal through a coupling capacitor 104. The common connection between the piezoelectric crystal 92 and the diode 101 also has an inductive reactance in the form of the coil 105 connected to ground and in parallel with a variable capacitor 106. Similarly, the piezoelectric crystal 93 has an inductive reactance in the form of a coil 107 connected between it and its common point of connection to diode 102 with the other end of the coil 107 being connected to ground. Connected in parallel with the coil 107 is a variable capacitor 108. In a like manner, the piezoelectric crystal 94 has an inductive reactance 109 connected between the common point of connection between the piezoelectric crystal 94 and diode 103, the other end of the coil 109 being connected to ground, while a variable capacitance 110 is connected in parallel with the coil 109.

A transistor 111 is connected to receive a gate signal impressed upon the input terminal 112 through a resistor 113. The emitter of the transistor 111 is connected to a negative potential of −12 volts as shown at $E_2$ while the collector of the transistor 111 is connected through appropriate resistors 114 and 115 to a positive potential of +18 volts as shown at $E_1$. When the gate signal is several volts positive with respect to $E_2$, i.e. −12 volts, the filter 91 is normally operative because the transistor 111 is saturated causing the diodes 101, 102 and 103 to be conductive creating an extremely low resistance path for the flow of input pulse signal to the crystals and the filter 91. Since the impedances of the inductive reactances in the form of the coils 105, 107 and 109 are relatively very high, there is little or no change in the normal operative filter response. When, however, the input signal to the gating circuit appearing at terminal 112 is approximately zero volts with respect to $E_2$, the transistor 111 cuts off allowing the cathodes of diodes 101, 102 and 103 to go positive with respect to their anodes causing them to become effectively open circuits.

This gating action is synchronized with the pulsed input signal so that the diodes 101, 102 and 103 are rendered nonconductive during the periods between periodic pulses of electrical energy received at the input terminal 90. Accordingly, the coils 105, 107 and 109 together with their respective variable capacitors 106, 108 and 110 present net inductive reactances which combine with the total electrostatic capacitances of the respective associated crystals 92, 93 and 94 to appear as resistive values as an operative result, residual stored electrical energy is rapidly and effectively dissipated from the crystals, thus enhancing the efficiency of the crystal filter 91 by making more time available for its reception of pulsed signals. The capacitors 116 and 117 are included in the gating circuitry of the transistor 111 to minimize switching transients.

Accordingly, it will be seen that the concept and teaching of the present invention is uniquely effective to enhance the operation of crystal filters and in actual practice it has been found that a single transistor controlled gating circuit similar to that schematically illustrated in FIG. 7 can be employed to rapidly and effectively dissipate the residually stored energy from 96 crystals simultaneously. This performance is indicative of the unusually high order of efficiency together with simplicity of implementation which is inherent in the concept and teaching of the present invention.

It will be apparent to those skilled in the art that the present invention inherently, by reason of its concept, is relatively insensitive to ambient conditions eliminating many of the desirable aspects of less stable concepts which were employed in the prior art. Moreover, the present invention can be readily and entirely implemented in solid state form further enhancing its reliability, stability as well as minimizing size and weight. Additionally, the concept of the present invention is such that its implementation together with crystal filters will not materially deteriorate the bandwidth response and other important operative characteristic s of the filters.

Obviously many modifications and variations of the present invention are possible in the light of the above teachings. It is therefore to be understood that within the scope of the appended claims the invention may be practiced otherwise than as specifically described.

I claim:

1. A circuit for rapidly dissipating residual electrical energy stored by a piezoelectric crystal filter due to pulsed signals impressed thereon comprising:

an inductive reactance having a value substantially equal to the capacitive reactance of the electrostatic capacitance of the crystal in the filter at the crystal resonant frequency;

switch means disposed for effecting conduction through said inductive reactance in circuit with said crystal filter; and control means for synchronously operating said switch means to effect said conduction between pulses of said signals impressed upon said crystal filter.

2. A circuit for rapidly dissipating residual electrical energy from a piezoelectric crystal filter as claimed in claim 1 wherein said conduction through said inductive reactance is effected in series circuit relationship with said crystal filter.

3. A circuit for rapidly dissipating residual electrical energy from a piezoelectric crystal filter as claimed in claim 1 wherein said conduction through said inductive reactance is effected in parallel circuit relationship with said crystal filter.

4. A circuit for rapidly dissipating residual electrical energy from a piezoelectric crystal filter as claimed in claim 1 wherein said switching means is arranged to disconnect said inductive reactance from said crystal filter.

5. A circuit for rapidly dissipating residual electrical energy from a piezoelectric crystal filter as claimed in claim 1 wherein said switching means is arranged to conductively bypass said inductive reactance in response to actuation of said control means.

6. A circuit for rapidly dissipating residual electrical energy from a piezoelectric crystal filter as claimed in claim 1 wherein said switching means comprises semiconductor means arranged and connected to conductively bypass said inductive reactance responsive to a gating signal.

7. A circuit for rapidly dissipating residual electrical energy from a piezoelectric crystal filter as claimed in claim 1 including a plurality of crystals and wherein said switching means comprises back-to-back diodes connected in series relation to each crystal of said filter and in parallel relation to each associated inductive reactance, and arranged to be conductively controlled responsive to a gating signal.

8. A circuit for rapidly dissipating residual electrical energy from a piezoelectric crystal filter as claimed in claim 1 including a plurality of crystals and wherein said inductive reactance comprises an inductance connected in parallel relationship to each crystal with respect to said pulsed signals; and said switching means comprises a diode connected in series relation to each crystal of said filter.

9. A circuit for rapidly dissipating residual electrical energy from a piezoelectric crystal filter as claimed in claim 8 wherein said control means comprises a gating circuit arranged to control the potential applied to each said diode whereby to determine conduction by each said diode.